United States Patent [19]

Kalal et al.

[11] 4,031,037

[45] June 21, 1977

[54] THREE-DIMENSIONAL POLYMERIC GEL MATERIALS CONTAINING PHOSPHORIC ACID RESIDUES CAPABLE OF DISSOCIATION AND A METHOD FOR THEIR PREPARATION

[76] Inventors: Jaroslav Kalal, No. 135 Belohorska, Prague 6; Jiri Coupek, No. 1580 Pankrac, Prague 4; Svatopluk Pokorny, No. 17 Mrstikova, Prague 10; Frantisek Svec, No. 2042 Bendlova, Kladno; Karel Bouchal, No. 6 N. Belojanise, Prague 5, all of Czechoslovakia

[22] Filed: Feb. 20, 1975

[21] Appl. No.: 551,271

Related U.S. Application Data

[63] Continuation-in-part of Ser. No. 500,080, Aug. 23, 1974, abandoned.

[30] Foreign Application Priority Data

Aug. 29, 1973 Czechoslovakia ................. 6008/73

[52] U.S. Cl. .............................. 260/2.2 R; 526/14; 526/16; 526/27; 526/274; 526/277
[51] Int. Cl.² .......................................... C08F 8/40
[58] Field of Search ......... 260/2.2 R, 80 PS, 80.71, 260/80 L, 2.1 R; 526/27, 14, 16, 277, 274

[56] References Cited

UNITED STATES PATENTS

| 2,610,953 | 9/1952 | Daul et al. | 260/17.4 |
|---|---|---|---|
| 3,250,756 | 5/1966 | Bergmeister | 260/91.3 |
| 3,586,646 | 6/1971 | Carte et al. | 260/2.2 R |
| 3,699,089 | 10/1972 | Wichterle | 260/328 |
| 3,855,364 | 12/1974 | Steckler | 260/952 |

FOREIGN PATENTS OR APPLICATIONS 2,247,739   4/1973   Germany

OTHER PUBLICATIONS

"Ion Exchange", Helfferich, 1962, New York, McGraw–Hill, p. 42.

*Primary Examiner*—Joseph L. Schofer
*Assistant Examiner*—Peter F. Kulkosky

[57] ABSTRACT

Organic three-dimensional polymeric gel-like materials containing covalently bonded phosphoric acid or a derivative thereof and a method for their manufacture. The bonding is accomplished by the reaction of the free hydroxy or epoxide groups in the homogeneous or macroporous gel-like matrix with the $H_3PO_4$, $P_2O_5$, phosphorus pentahalide and oxyhalide. The halide containing groups may then be hydrolyzed to form acid groups which then may be modified to form complex compounds by reaction with Lewis acids. The gel material may serve as a strongly acidic cation exchanger, catalyst or polymer reagent.

13 Claims, No Drawings

THREE-DIMENSIONAL POLYMERIC GEL MATERIALS CONTAINING PHOSPHORIC ACID RESIDUES CAPABLE OF DISSOCIATION AND A METHOD FOR THEIR PREPARATION

RELATED APPLICATION

This application is a continuation-in-part of application Ser. No. 500,080, filed Aug. 23, 1974, and now abandoned, the benefit of its disclosure and filing date is claimed, and to which reference is fully made.

BACKGROUND OF THE INVENTION

This invention relates to organic polymeric gel-like materials chemically crosslinked and containing covalently bonded phosphoric acid molecules or a derivative thereof, which gels are acidic in character and capable of dissociation to the first or second degree. The materials are possessed of ion exchange properties, catalytic effects and the like. The polymers of the invention are preferably prepared by suspension copolymerization of acrylic or methacrylic acid derivatives containing one or more hydroxyl or epoxide groups with crosslinking comonomers containing two or more double bonds able to copolymerize therewith (for instance, acryloyl or methacryloyl double bonds, or with divinylbenzene or divinylsulfone), and by the subsequent reaction of the produced three-dimensional polymers containing free hydroxyl groups or epoxide groups with phosphoric acid or a derivative thereof. Besides the aforementioned crosslinked gels which are homogeneous, heterogeneous gels may also be prepared using established reaction conditions. The gels are notable for their permanent porosity even in a dry state, their well-defined pore size distribution and their large inner surfaces. These properties give the gel materials a satisfactory exchange capacity for the functional groups bonded at the surface thereof. The materials prepared in this way may be advantageously used as strong cation-exchangers, as efficient catalysts for chemical reactions, and also as polymer reactants employing the reactivity of the chemically bonded phosphoric acid or its halogen derivatives.

A large number of ion-exchangers are known which have strongly acidic functional groups bonded to organic polymers. Copolymers of styrene and divinylbenzene are predominantly used as carriers and sulfonic groups -$SO_3H$ as the functional exchange groups. The styrene-divinylbenzene copolymers are mostly homogeneous and are noted for their three-dimensional structure having a low density of crosslinks, such that they will swell in certain solvents. The macroporous structure thereof is achieved by copolymerization with a higher amount of a crosslinking agent in the presence of inert solvents having various solvation powers relative to the polymer.

According to the present invention, strongly acidic cation-exchangers can be obtained by the chemical fixation of phosphoric acid molecules to a copolymeric matrix by the chemical reaction of the previously prepared polymeric gel with phosphoric acid or its derivative. The invention takes advantage of the ability of phosphoric acid or a derivative thereof to react with hydroxyl or epoxide groups present in the gel. The macroporous gels thus obtained have significant advantage, in many applications, since they exhibit a measurable constant porosity coupled with a large surface area at the point where the bonding reaction takes place. These properties afford easy accessibility of the acidic functional group for further reacting components. It should be noted that the characteristics do not, however, exclude the application of the aforementioned homogeneous crosslinked gels, modified by phosphorylation in accordance with the present invention, in some processes in the low-molecular-weight region, as in ion exchange, acid catalysis of organic reactions, and the like.

It is accordingly an object of the instant invention to avoid one or more drawbacks of the prior art.

It is a further object of the invention to provide for improved three-dimensional polymeric gel materials containing phosphoric acid residues capable of dissociation and a method for their preparation.

These and other objects of the invention will become more apparent from the following detailed disclosure and from the appended claims.

DESCRIPTION OF THE INVENTION

Broadly speaking the invention includes the provision of an organic polymeric three-dimensional gel-like composition containing covalently bonded phosphoric acid moieties comprising a copolymer of an acrylic or methacrylic acid ester containing at least one functional hydroxyl group or an acrylic or methacrylic acid derivative containing at least one epoxide group and a crosslinking monomer containing at least two double bonds, phosphorylated with radicals selected from the group consisting of phosphoric acid, phosphorus pentoxide, phosphorus halide, phosphorus oxyhalide and complexes of phosphoric acid with strong Lewis acids.

The term "carrier" as used herein is understood to define polymeric materials prepared by copolymerization of acrylic or methacrylic esters containing one or more (at least one) hydroxyl functional group, as for instance an hydroxy $C_2$ to $C_6$ alkyl acrylate, hydroxy $C_2$ to $C_6$ methacrylate, oligo- or polyglycol acrylates such as ethyleneglycol acrylate, diethyleneglycol acrylate, $C_{20}$-polyethyleneglycol acrylate, oligo- or polyglycol methacrylates such as ethyleneglycol methacrylate, diethyleneglycol methacrylate, tetraethyleneglycol methacrylate and $C_{20}$-polyethyleneglycol methacrylate, or derivatives of acrylic or methacrylic acid containing at least 1 epoxide group, for example, glycidyl acrylate, glycidyl methacrylate, glycidyl sorbate, glycidyl allyl phthalate, 1,2-epoxybutene-3, glycidyl allyl maleate and the like, with crosslinking monomers which are soluble in the monomeric mixture containing at least two double bonds capable of polymerization in their molecule, as for example ethylene dimethacrylate and other alkylene dimethacrylates, $C_2$ - $C_{10}$ alkylene diacrylates, oligo- or polyglycol diacrylates such as ethylene diacrylate, ethylene dimethacrylate and oligo- or polyglycol dimethacrylates such as diethyleneglycol diacrylate and dimethacrylate and butanediol dimethacrylate, di- or polyacryloylated or methacryloylated polyfunctional alcohols such as pentaerythritol tetramethacrylate, trimethylolethane trimethacrylate and trimethylolpropane trimethacrylate or alcoholic sugars as triacryloylperhydrotriazine, methylenebismethacrylamide, divinylbenzene, divinylsulfone, and the like.

In order to control the polarity of the gel material which requires a definite affinity for the solvent or solute so as to enable its reaction with the bonded phosphoric acid, the polymerization can be carried out with more or less of a material such as styrene, $C_1$ to $C_{18}$ alkyl methacrylate, $C_1$ to $C_{18}$ alkyl acrylate, acrylonitrile, methacrylonitrile, acrylamide, methacrylamide, acryloylmorpholine, and the like. The necessary condition which has to be met in the selection of the third comonomer where employed, is sufficient thermal and hydrolytic stability under the reaction conditions of the phosphoric acid bonding as well as under the conditions of the further cation exchanger use after the comonomer has been built into the aforedescribed copolymeric matrix.

The ratio of the two basic monomers, that is, the acrylic or methacrylic ester material to the crosslinking monomer is about 90 to 10, and preferably is about 60 to 40. Expressed differently, the total amount of the ester in the monomer mixture, based on the total weight of the latter is about 10 to 90% %, and preferably amounts to about 40 to 60%.

Based upon weight, the aforementioned third monomer is employed in the total mixture in amounts of about 10 to 50%, preferably 20 to 40%.

The polymerization product precursor, employed in the phosphorylation bonding is prepared by standard polymerization methods known in the art. Preferably, suspension polymerization is employed, carried out at temperatures of about 60° to 90° C, employing about 0.5 to 1% catalyst therefor. The particular method of polymerization forms no essential part of the instant invention.

The phosphoric acid bonding is thereafter carried out such that the free hydroxyl or epoxide groups of the polymeric gel are allowed to react under suitable conditions with the phosphorus compound so as to provide the material with chemically bonded phosphoric acid molecules capable of dissociating in the first and also the second degree, either directly ($H_3PO_4$) or after hydrolysis ($POCl_3$, $P_2O_5$, $PCl_5$). The non-hydrolyzed products of the reaction between the gels and phosphorus oxychloride may be used as highly reactive polymeric reagents for bonding compounds which contain e.g. hydroxyl groups such as alcohols, sugars, nucleotides, nucleic acids, and the like. The above-mentioned compounds are linked to the gel through ester groups after these reactions. It should be noted that phosphoric acid, chemically bonded to the polymeric matrix may also form coordination compounds having themselves practical applications. The complex acid

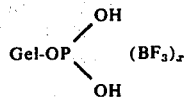

is formed in the reaction of the dried phosphorylated gel with gaseous boron trifluoride and may be advantageously used as an effective catalyst. Analogous complexes may be prepared also with other Lewis acids, as with $AlCl_3$, $AlBr_3$, $SbCl_3$, $SnCl_4$, $ZnCl_2$ or $FeBr_3$.

The procedure for carrying out the phosphorylation bonding to the polymeric gel involves preferably adding the phosphorylating material to the polymer, with stirring at temperatures of about 0° to 110° C.

In a preferred embodiment, the polymeric material prior to phosphorylation is added to an adequate amount of dry benzene or like material such as toluene, xylene and thereafter the phosphorylating agent is added thereto.

The invention is further illustrated in the following Examples which, however, by no means are to be construed as limiting its scope. All parts and percents given in the Examples and the appended claims are by weight unless otherwise stated.

EXAMPLE 1

About 100 parts of a macroporous copolymer of 2-hydroxyethyl methacrylate and ethylene dimethacrylate having a molecular weight exclusion limit of about 300,000 units, a specific surface area of about 77 m²/g, and a particle size of about 200–300 μm is suspended in a sulfonating flask in about 300 parts of dry benzene with about 75 parts of triethylamine. Phosphorus oxychloride ($POCl_3$, about 100 parts) is gradually added under effective stirring at about 0 to 5° C so that the temperature does not exceed the given range. After all the phosphorus oxychloride has been added, the mixture is stirred at a temperature of 10° C for about 2 hours and then left at about 5° C for about 12 hours. The suspended gel is then separated from the liquid phase by filtration, washed three times with about 100 parts of chloroform and dried in vacuo. A part of the dry gel which contains nonhydrolyzed

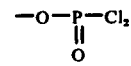

groups is used for a later reaction with alcohol (see Example 10). The hydrolysis is carried out by gradually introducing 100 parts of the dry gel into about 2000 parts of 10% $NaHCO_3$ solution under intense evolution of carbon dioxide. After all of the gel has been added to the sodium bicarbonate solution, the mixture is allowed to stand at room temperature. The gel is then washed ten times with about 200 parts of distilled water, converted into an H-cycle by a threefold washing with about 1000 parts of 5% HCl, washed five more times with about 200 parts of distilled water (to neutral reaction), finally washed with acetone and ether on a filter and dried. The resulting product is potentiometrically titrated with 0.1N NaOH solution and exhibits an exchange capacity of 2.2 mequivalents per gram.

The term "molecular weight exclusion limit" is defined as the lowest molecular weight of defined standard compound (polydextran) which is still excluded from diffusion into the polymer matrix or pores of a gel.

Molecular weight is determined by viscometry and light scattering method.

EXAMPLE 2

A cation-exchanger having an exchange capacity of about 2.35 mequivalents/g is prepared using the procedure of Example 1, with the distinction that a macroporous copolymer of triethylene glycol monomethacrylate with ethylene dimethacrylate is used which has a molecular weight exclusion limit of about 100,000.

EXAMPLE 3

A phosphorylated cation-exchanger having an exchange capacity of about 1.98 mequivalents/g is prepared analogously to Example 1, with the distinction that a copolymer of 2-hydroxyethyl methacrylate, methyl methacrylate and ethylene dimethacrylate is used as the carrier, which has a molecular weight exclusion limit of about 500,000.

EXAMPLE 4

A phosphorylated cation-exchanger is prepared analogously to Example 1, with the distinction that a copolymer of diethylene glycol dimethacrylate, diethylene glycol monomethacrylate and acrylamide is used as the carrier. The carrier has a molecular weight exclusion limit of about 50,000 and the exchange capacity of the resulting cation-exchanger is 1.34 mequivalents/g.

EXAMPLE 5

1 Part of a suspension copolymer of styrene, glycidyl methacrylate and divinylbenzene containing 27.3% of glycidyl methacrylate is swollen in about 20 parts of dry toluene and then about 2.5 parts of phosphorus pentoxide is added under stirring at a temperature of about 110° C with boiling of the solvent under reflux. After about 15 hours, the product is washed with about 20 parts of ethanol, about 20 parts of water and again with about 10 parts of ethanol. The concentration of bonded phosphoric acid is determined in the filtered and dried gel and amounts to 23.4%.

EXAMPLE 6

The suspension copolymer described in Example 5 (1 part) is allowed to react as described in Example 5 with about 3.3 parts of 85% phosphoric acid for about 24 hours. The resulting product is further processed analogously to Example 5. The concentration of bonded phosphoric acid is 17.5%.

EXAMPLE 7

1 Part of macroporous copolymer of 2-hydroxyethyl methacrylate with ethylene dimethacrylate having a molecular weight exclusion limit of about 300,000 is allowed to react with phosphorus pentoxide similarly to Example 5. The product is washed and its exchange capacity is determined by potentiometric titration of the cation exchanger and amounts to 0.713 mequivalents/g.

EXAMPLE 8

1 Part of a macroporous copolymer of 2-hydroxyethyl methacrylate with ethylene dimethacrylate having a molecular weight exclusion limit of about 300,000 is allowed to react with about 85% phosphoric acid under analogous conditions to that of Example 6. The exchange capacity of the resulting product is 1.84 mequivalents/g.

EXAMPLE 9

7 Parts of the cation-exchanger prepared according to Example 1 are placed in a flask equipped with an inlet tube for gas and a thermoelectric thermometer. A mixture of $BF_3$ and nitrogen is bubbled through the dry gel under outside cooling with ice at such rate that the temperature which is monitored by a thermocouple does not exceed 60° C. After the reaction heat evolution ceases, the gel is flushed for about 15 minutes with nitrogen to remove the adsorbed unreacted boron trifluoride. The weight increase of the product is about 32% and changes neither by further flushing of gel particles with nitrogen nor by evacuation. The complex of phosphoric acid with boron trifluoride linked to the gel matrix is used as an effective catalyst for Friedel-Crafts reactions and in the initiation of styrene and ethylene oxide polymerization.

EXAMPLE 10

10 Parts of the non-hydrolyzed product of Example 1 are heated in about 100 parts of benzene with about 10 parts of dodecyl alcohol to about 80° C for about 4 hours. The esterification of free hydroxyl groups of phosphoric acid bonded to the gel proceeds to completion as determined from the mass increment and from elemental analysis.

EXAMPLE 11

A cation-exchanger having an exchange capacity of about 1.92 mequivalents/g is prepared analogously to Example 1 with the distinction that instead of phosphorus oxychloride, the same amount of $PCl_5$ is used in the preparation.

Although the present invention has been described with reference to particular embodiments and Examples, it will be apparent to those skilled in the art that variations and modifications of this invention can be made and that equivalents can be substituted for various ingredients without departing from the principles and spirit of the invention.

We claim:

1. An organic polymeric composition prepared by directly reacting a macroporous copolymer matrix of (a) an acrylic or methacrylic acid ester monomer containing at least one functional hydroxyl group or an acrylic or methacrylic acid derivative monomer containing at least one epoxide group and (b) a cross-linking monomer containing at least two double bonds, said cross-linking monomer (b) being at least 10% by weight based on the total weight of the monomers, with a member selected from the group consisting of phosphoric acid, phosphorus pentoxide, phosphorus halide, phosphorus oxyhalide and complexes of phosphoric acid with strong Lewis acids, at a temperature of 0° to 110° C. in the presence of an organic solvent selected from the group consisting of dry benzene, toluene and xylene for at least 2 hours to covalently bond phosphoric acid moieties to said hydroxyl or epoxide groups.

2. A composition as defined in claim 1, wherein component (a) is selected from the group consisting of lower alkylene glycol monoacrylates and monomethacrylates, lower polyalkylene glycol monoacrylates and monomethacrylates and lower epoxyalkyl acrylates and methacrylates.

3. A composition as defined in claim 1, wherein component (a) is selected from the group consisting of hydroxy $C_2$ to $C_6$ alkyl acrylates, hydroxy $C_2$ to $C_6$ alkyl methacrylates, oligo- or polyglycol acrylates, oligo- or polyglycolmethacrylates and glycidyl acrylate and glycidyl methacrylate.

4. A composition as defined in claim 1, wherein component (b) is selected from the group consisting of ethylene dimethacrylate, $C_2$ to $C_{10}$ alkylene diacrylates, oligo- or polyglycol diacrylates, oligo- or polyglycol dimethacrylates, di or polyacryloylated or methacryloylated polyfunctional alcohols, triacryloylperhydrotriazine, methylenebismethacrylamide, divinylbenzene and divinylsulfone.

5. A composition as defined in claim 1, wherein said polymer matrix is a terpolymer matrix additionally containing (c) a monomer selected from the group consisting of styrene, methyl-styrene, $C_1$ to $C_{18}$ alkyl esters of acrylic and methacrylic acids, acrylonitrile, methacrylonitrile, acrylamide, methacrylamide and acryloylmorpholine, said component (c) being present in an amount of 10 to 50% by weight based on the total monomer weight.

6. A composition as defined in claim 1, wherein the ratio of component (a) to component (b) is about 20:80.

7. A method of making the organic polymeric composition of claim 1 which comprises directly reacting a macroporous copolymer matrix of an acrylic or methacrylic acid ester monomer containing at least one functional hydroxyl group or an acrylic or methacrylic acid derivative monomer containing at least one epoxide group and (b) a cross-linking monomer containing at least two double bonds wherein said cross-linking monomer is present in an amount of at least 10% based on the total weight of said monomers, with a member selected from the group consisting of phosphoric acid, phosphorus pentoxide, phosphorus halide, phosphorus oxyhalide and complexes of phosphoric acid with strong Lewis acids, at a temperature of 0° to 110° C in the presence of an organic solvent selected from the group consisting of dry benzene, toluene and xylene for at least 2 hours to covalently bond phosphoric acid moieties to said hydroxyl or epoxide groups and recovering said copolymer.

8. A method of making the organic polymeric composition of claim 5, which comprises directly reacting a macroporous terpolymer matrix of (a) an acrylic or methacrylic acid ester monomer containing at least one functional hydroxyl group or an acrylic or methacrylic acid derivative monomer containing at least one epoxide group and (b) a cross-linking monomer containing at least two double bonds and (c) a monomer selected from the group consisting of styrene, methylstyrene, $C_1$ to $C_{18}$ alkyl esters of acrylic and methacrylic acids, acrylonitrile, methacrylonitrile, acrylamide, methacrylamide and acryloylmorpholine, said cross-linking monomer being present in an amount of at least 10% by weight based on the total weight of said monomers and said component (c) being present in an amount of 10 to 50% by weight based on the total monomer weight, with a member selected from the group consisting of phosphoric acid, phosphorus pentoxide, phosphorus halide, phosphorus oxyhalide and complexes of phosphoric acid with strong Lewis acids at a temperature of 0° to 110° C in the presence of an organic solvent selected from dry benzene, toluene and xylene for at least 2 hours to covalently bond phosphoric acid moieties to said hydroxyl or epoxide groups, and recovering said terpolymer.

9. Method according to claim 7, wherein said organic solvent is a solvent for the copolymer of (a) and (b) but not for the phorphorylated copolymer.

10. Method according to claim 7, wherein about 1 mol of phosphorylated agent is employed for each mol equivalent of hydroxyl or epoxide groups in said copolymer.

11. A catalyst consisting essentially of the composition of claim 1.

12. A coordination complex consisting essentially of the composition of claim 1 complexed with a Lewis acid.

13. A cation exchange composition consisting essentially of the composition of claim 1.

* * * * *